(12) United States Patent
Chen et al.

(10) Patent No.: US 8,189,286 B1
(45) Date of Patent: May 29, 2012

(54) DISK DRIVE EMPLOYING VELOCITY INSENSITIVE SERVO BURST PATTERN

(75) Inventors: Min Chen, San Leandro, CA (US); Qixing Zheng, Albany, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/785,307

(22) Filed: May 21, 2010

(51) Int. Cl.
G11B 5/596 (2006.01)
(52) U.S. Cl. ............... 360/77.08; 360/78.14; 360/77.04
(58) Field of Classification Search .................. None
See application file for complete search history.

(56) References Cited

U.S. PATENT DOCUMENTS

| | | | |
|---|---|---|---|
| 4,438,467 | A | 3/1984 | Schaller et al. |
| 4,669,004 | A | 5/1987 | Moon et al. |
| 5,381,281 | A | 1/1995 | Shrinkle et al. |
| 5,483,393 | A | 1/1996 | Mento et al. |
| 5,710,677 | A | 1/1998 | Teng et al. |
| 5,798,883 | A | 8/1998 | Kim |
| 5,870,243 | A | 2/1999 | Ukani et al. |
| 5,930,068 | A | 7/1999 | Gregg et al. |
| 5,946,158 | A | 8/1999 | Nazarian et al. |
| 5,982,173 | A | 11/1999 | Hagen |
| 6,005,739 | A | 12/1999 | Yun |
| 6,067,204 | A | 5/2000 | Tremaine |
| 6,091,564 | A | 7/2000 | Codilian et al. |
| 6,091,567 | A | 7/2000 | Cooper et al. |
| 6,101,064 | A * | 8/2000 | Shepherd .................. 360/77.08 |
| 6,144,513 | A | 11/2000 | Reed et al. |
| 6,151,180 | A | 11/2000 | Bang |
| 6,163,419 | A | 12/2000 | Sobey et al. |
| 6,172,836 | B1 | 1/2001 | Bang |
| 6,369,974 | B1 | 4/2002 | Asgari et al. |
| 6,445,522 | B1 | 9/2002 | Tsunoda et al. |
| 6,476,997 | B2 | 11/2002 | Fukushima et al. |
| 6,611,397 | B1 | 8/2003 | Nguyen |
| 6,687,080 | B2 | 2/2004 | Smith et al. |
| 6,735,040 | B2 | 5/2004 | Galloway et al. |
| 6,754,016 | B2 | 6/2004 | Messner et al. |
| 6,768,609 | B2 | 7/2004 | Heydt et al. |
| 6,791,778 | B2 | 9/2004 | Chu et al. |
| 6,906,883 | B2 | 6/2005 | Chu et al. |
| 6,937,420 | B1 | 8/2005 | McNab et al. |
| 6,954,323 | B2 | 10/2005 | Deeman et al. |
| 6,989,956 | B2 | 1/2006 | Takaishi et al. |
| 7,009,391 | B2 | 3/2006 | Lee et al. |
| 7,019,937 | B1 | 3/2006 | Liikanen et al. |
| 7,023,637 | B1 | 4/2006 | Kupferman |
| 7,027,257 | B1 | 4/2006 | Kupferman |

(Continued)

FOREIGN PATENT DOCUMENTS

JP 2001256741 A 9/2001

Primary Examiner — Andrew L Sniezek

(57) ABSTRACT

A disk drive is disclosed comprising a head actuated over a disk comprising a plurality of servo sectors that define a plurality of servo tracks. The servo sectors comprise a plurality of servo bursts including a first servo burst, a second servo burst following the first servo burst and offset radially by approximately one half of a servo track from the first servo burst, a third servo burst following the second servo burst and offset radially by approximately one full servo track from the second servo burst, and a fourth servo burst following the third servo burst and offset radially by approximately one half of a servo track from the third servo burst. A PES is generated form the servo bursts that is substantially insensitive to a radial velocity of the head.

20 Claims, 5 Drawing Sheets

U.S. PATENT DOCUMENTS

| | | |
|---|---|---|
| 7,061,708 B2 | 6/2006 | Ehrlich et al. |
| 7,082,005 B2 | 7/2006 | Annampedu et al. |
| 7,123,433 B1 | 10/2006 | Melrose et al. |
| 7,130,146 B2 | 10/2006 | Ehrlich |
| 7,149,048 B1 | 12/2006 | Ray et al. |
| 7,158,333 B1 | 1/2007 | Sutardja et al. |
| 7,161,759 B1 | 1/2007 | Zhang et al. |
| 7,180,696 B2 | 2/2007 | Ehrlich |
| 7,203,024 B2 | 4/2007 | Lee et al. |
| 7,209,314 B2 | 4/2007 | Bandic et al. |
| 7,212,364 B1 | 5/2007 | Lee |
| 7,230,786 B1 | 6/2007 | Ray et al. |
| 7,230,789 B1 | 6/2007 | Brunnett et al. |
| 7,245,451 B2 | 7/2007 | Ehrlich |
| 7,248,426 B1 | 7/2007 | Weerasooriya et al. |
| 7,253,984 B1 | 8/2007 | Patapoutian et al. |
| 7,256,956 B2 | 8/2007 | Ehrlich |
| 7,265,933 B1 | 9/2007 | Phan et al. |
| 7,382,564 B1 | 6/2008 | Everett et al. |
| 7,391,583 B1 | 6/2008 | Sheh et al. |
| 7,397,621 B2 | 7/2008 | Hou et al. |
| 7,423,835 B2 | 9/2008 | Sado et al. |
| 7,450,336 B1 | 11/2008 | Wang et al. |
| 7,502,197 B1 | 3/2009 | Chue |
| 7,542,230 B1 | 6/2009 | Melrose et al. |
| 7,567,405 B2 | 7/2009 | Kato et al. |
| 7,616,399 B1 | 11/2009 | Chen et al. |
| 7,746,592 B1 | 6/2010 | Liang et al. |
| 7,746,594 B1 | 6/2010 | Guo et al. |
| 7,746,595 B1 | 6/2010 | Guo et al. |
| 2007/0273992 A1 | 11/2007 | Kuroda |
| 2008/0239536 A1 | 10/2008 | Asakura |
| 2009/0040641 A1 | 2/2009 | Ehrlich et al. |
| 2009/0046385 A1 | 2/2009 | Yamamoto |
| 2009/0067084 A1 | 3/2009 | Lau et al. |
| 2009/0067090 A1 | 3/2009 | Ling et al. |
| 2009/0097157 A1 | 4/2009 | Spaur et al. |
| 2009/0316295 A1 | 12/2009 | Kim et al. |
| 2010/0053800 A1 | 3/2010 | Ozturk et al. |

\* cited by examiner

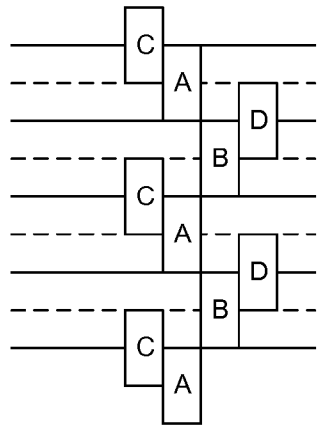
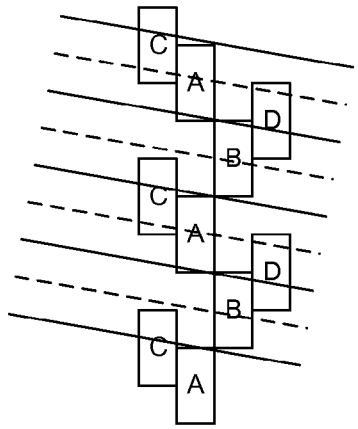
FIG. 3A                FIG. 3B
CD BOUNDARY                AB BOUNDARY
$$PES = -\frac{1}{4} \cdot \frac{D-C}{B-A} \quad OR \quad PES = +\frac{1}{4} \cdot \frac{B-A}{D-C}$$
FIG. 3C
| BOUNDARY CONDITIONS | PES |
| --- | --- |
| E1: (C > D) & (A <= B) & (C-D > B-A) | E1: -64*(B+D-A-C)/(D-C) |
| E2: (C > D) & (A <= B) & (C-D <= B-A) | E2: -64*(B+D-A-C)/(A-B) |
| E3: (C <= D) & (A <= B) & (B-A > D-C) | E3: -64*(A+D-B-C)/(A-B) |
| E4: (C <= D) & (A <= B) & (B-A <= D-C) | E4: -64*(A+D-B-C)/(C-D) |
| E5: (C <= D) & (A > B) & (D-C > A-B) | E5: -64*(A+C-B-D)/(C-D) |
| E6: (C <= D) & (A > B) & (D-C <= A-B) | E6: -64*(A+C-B-D)/(B-A) |
| E7: (C > D) & (A > B) & (A-B > C-D) | E7: -64*(B+C-A-D)/(B-A) |
| E8: (C > D) & (A > B) & (A-B <= C-D) | E8: -64*(B+C-A-D)/(D-C) |
FIG. 3D

DISK DRIVE EMPLOYING VELOCITY INSENSITIVE SERVO BURST PATTERN

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 3A illustrates the spacing of servo tracks as defined by the PES when the radial velocity of the head is zero.

FIG. 3B illustrates how the spacing of the servo tracks remains substantially unchanged when the radial velocity of the head is non-zero.

FIG. 3C shows an example equation for generating the PES according to an embodiment of the present invention.

FIG. 3D shows alternative equations for generating the PES according to an embodiment of the present invention.

DETAILED DESCRIPTION OF EMBODIMENTS OF THE INVENTION

Figure 1:
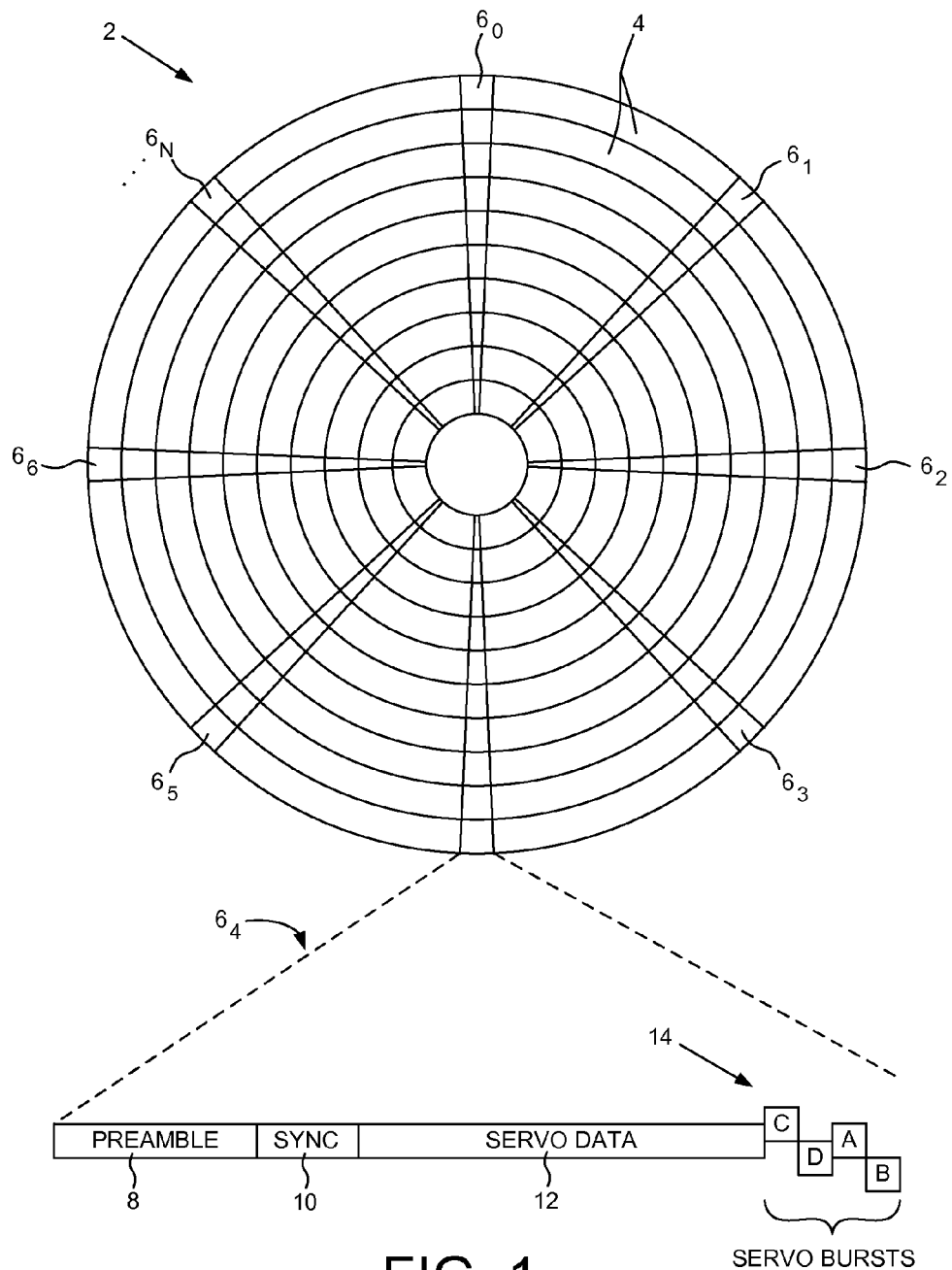
FIG. 1 shows a prior art disk format comprising a plurality of servo tracks defined by embedded servo sectors.
Figure 2A:
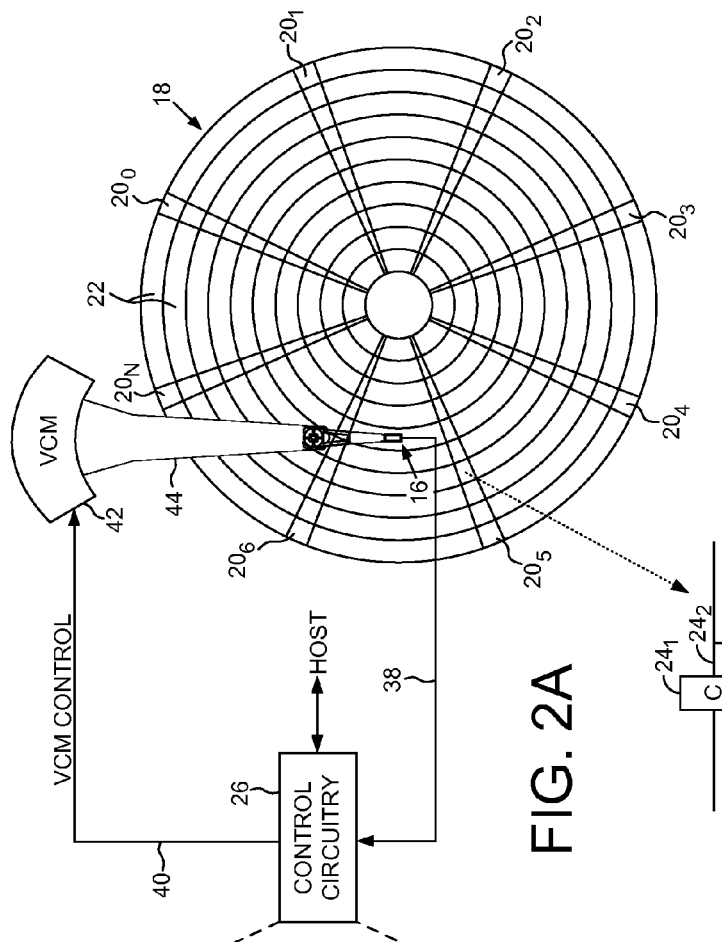
FIG. 2A shows a flow diagram according to an embodiment of the present invention comprising a head actuated over a disk and control circuitry.
Figure 2B:
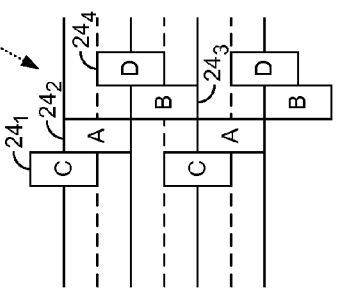
FIG. 2B shows a servo burst format according to an embodiment of the present invention that generates a position error signal (PES) substantially insensitive to a radial velocity of the head.

FIG. 2A shows a disk according to an embodiment of the present invention comprising a head 16 actuated over a disk 18 comprising a plurality of servo sectors $20_0$-$20_N$ that define a plurality of servo tracks 22. The servo sectors comprise a plurality of servo bursts 24 (FIG. 2B) including a first servo burst $24_1$, a second servo burst $24_2$ following the first servo burst $24_1$ and offset radially by approximately one half of a servo track from the first servo burst $24_1$, a third servo burst $24_3$ following the second servo burst $24_2$ and offset radially by approximately one full servo track from the second servo burst $24_2$, and a fourth servo burst $24_4$ following the third servo burst $24_3$ and offset radially by approximately one half of a servo track from the third servo burst $24_3$.

Figure 2C:
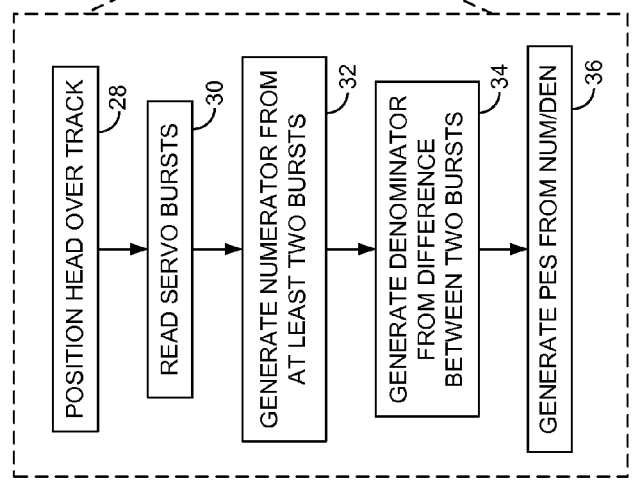
FIG. 2C is a flow diagram executed by the control circuitry according to an embodiment of the present invention wherein the PES is generated by dividing a numerator by a denominator.

The disk drive of FIG. 2A further comprises control circuitry 26 for executing the flow diagram of FIG. 2C, wherein the head is positioned over a servo track (step 28) and at least two of the servo bursts are read (step 30). A numerator is generated in response to at least two of the servo bursts (step 32), and a denominator is generated in response to a difference between two of the servo bursts (step 34). A position error signal (PES) is generated in response to a ratio of the numerator and the denominator (step 36), wherein the PES is used to position the head over the disk.

In the embodiment of FIG. 2A, the control circuitry 26 processes a read signal 38 emanating from the head 16 to read the servo bursts (FIG. 2B) and generate the PES. The control circuitry 26 comprises a suitable servo compensator which filters the PES to generate a control signal 40 applied to a voice coil motor (VCM) 42. The VCM 42 rotates an actuator arm 44 about a pivot in response to the control signal 40 in order to move the head 16 radially over the disk in a direction that reduces the PES.

The head 16 may be moving radially over the disk as it crosses over a servo sector, for example, during a seek operation when the head is being moved toward a target data track, during a settle operation when the head is settling on the target data track, and during a tracking operation when the head is tracking a centerline of the target data track due to repeatable runout (RRO) of the servo tracks. FIG. 3A illustrates how the PES generated from the servo burst pattern of FIG. 2B defines the width of the servo tracks when the radial velocity of the head is zero, and FIG. 3B illustrates how the PES generated from the servo burst pattern of FIG. 2B defines the width of the servo tracks when the radial velocity of the head is non-zero. As illustrated in FIG. 3B, the width of the servo tracks as defined by the PES is substantially unchanged when the radial velocity of the head is non-zero. In other words, the accuracy of the PES is substantially insensitive to the radial velocity of the head when reading a servo sector. In the embodiments of the present invention, any suitable equation may be used to generate a PES that is insensitive to a radial velocity of the head when reading the servo pattern of FIG. 2B. FIG. 3C shows an embodiment of the present invention wherein the servo bursts are selected for generating the PES based on a boundary condition for the head. When the head is closer to a centerline defined by the CD burst pair, the first equation of FIG. 3C is used to generate the PES, and when the head is closer to a centerline defined by the AB burst pair, the second equation of FIG. 3C is used to generate the PES. Further details of this embodiment are disclosed in U.S. Pat. No. 6,369,974 entitled "DISK DRIVE WITH METHOD OF CONSTRUCTING CONTINUOUS POSITION SIGNAL AND CONSTRAINED METHOD OF LINEARIZING SUCH POSITION SIGNAL WHILE MAINTAINING CONTINUITY", the disclosure of which is incorporated herein by reference.

FIG. 3D shows an alternative embodiment of the present invention for generating the PES based on a boundary condition for the head. This embodiment defines eight boundary conditions for the head and eight corresponding equations for generating the PES. The boundary condition for the head is determined by evaluating the magnitude of the servo bursts relative to one another as shown in FIG. 3D. Further details of this embodiment are disclosed in U.S. Pat. No. 7,616,399 entitled "DISK DRIVE SERVO CONTROL TECHNIQUES TO PRESERVE PES CONTINUITY", the disclosure of which is incorporated herein by reference.

Figure 4A:
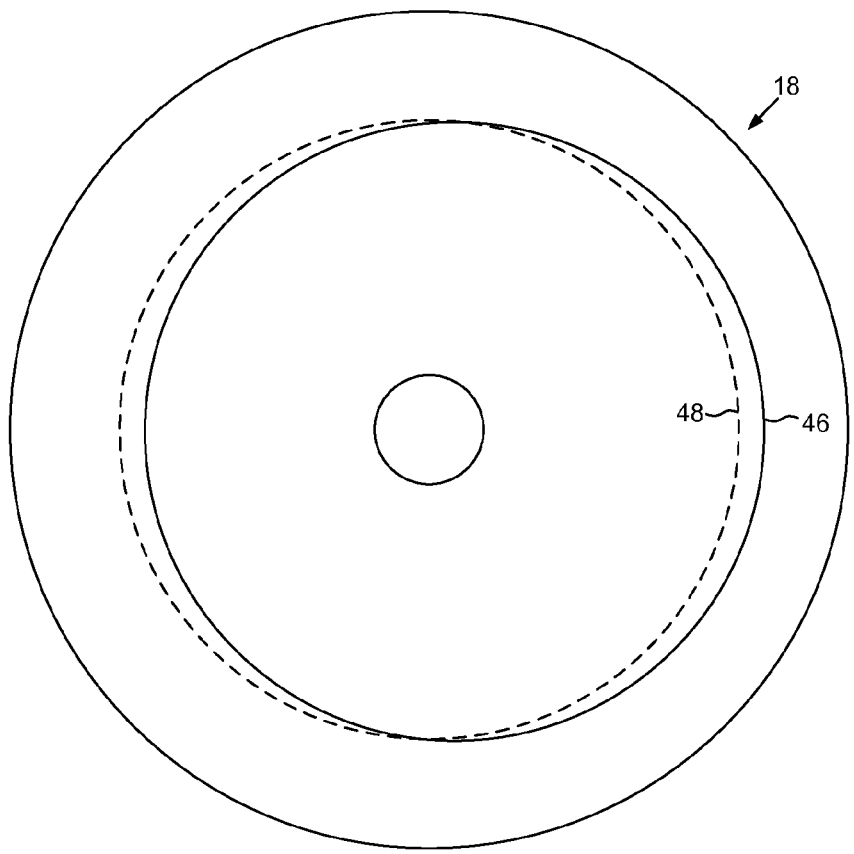
FIG. 4A illustrates how the servo tracks may comprise a repeatable runout (RRO) relative to a rotational center of the disk.
Figure 4B:
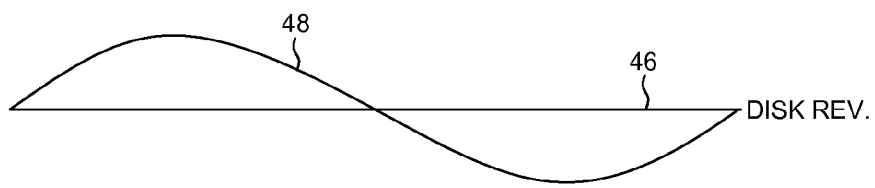
FIG. 4B illustrates how the RRO of the servo tracks causes a radial velocity of the head when tracking a substantially circular data track defined relative to a rotational center of the disk.

FIG. 4A illustrates an embodiment of the present invention wherein the disk 18 comprises an eccentric servo track 46 relative to a rotational center of the disk 18, and a data track 48 that is substantially circular relative to the rotational center of the disk 18. The eccentricity of the servo track 46 may be due, for example, to an offset between the center axis of a spindle motor that rotates the disk and the center of the disk when clamped to the spindle motor. With the data track 48 defined along a circle path with respect to the center of rotation (the axis of the spindle motor), the data track 48 will move relative to the servo track 46 over a revolution of the disk in a sinusoidal deviation as shown in FIG. 4B. Consequently, when the control circuitry maintains the head along the circular path of the data track 48, the head will have a non-zero radial velocity as it crosses over the servo track 46 (as well as when the head crosses over other adjacent servo tracks). Using the servo pattern shown in FIG. 2B the radial velocity of the head does not significantly impact the accuracy of the resulting PES used to maintain the head over the data track (i.e., the radial velocity of the head over the servo burst pattern of FIG. 2B does not significantly degrade tracking performance).

Figure 5A:
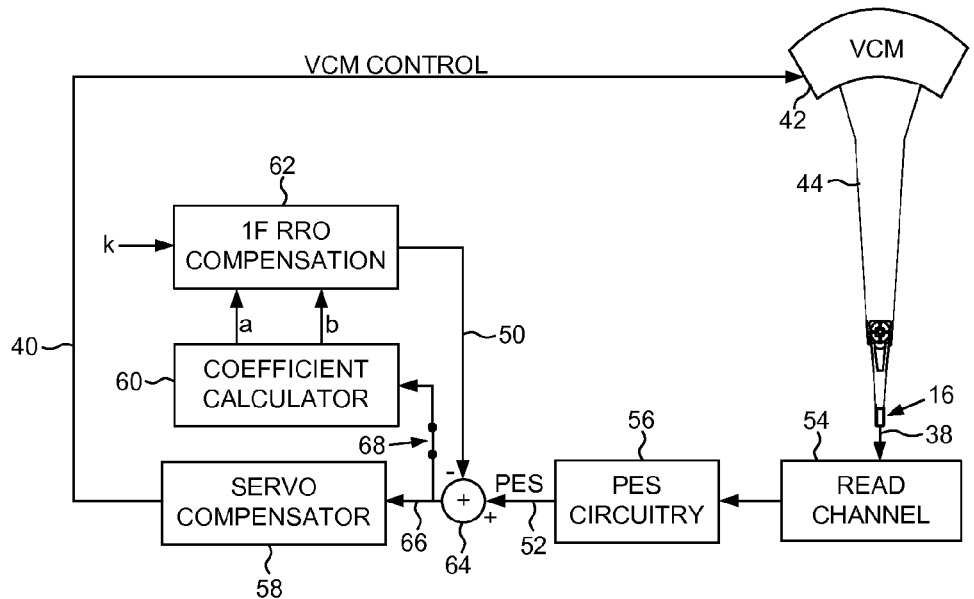
FIG. 5A shows control circuitry according to an embodiment of the present invention for calibrating RRO compensation values.
Figure 5B:
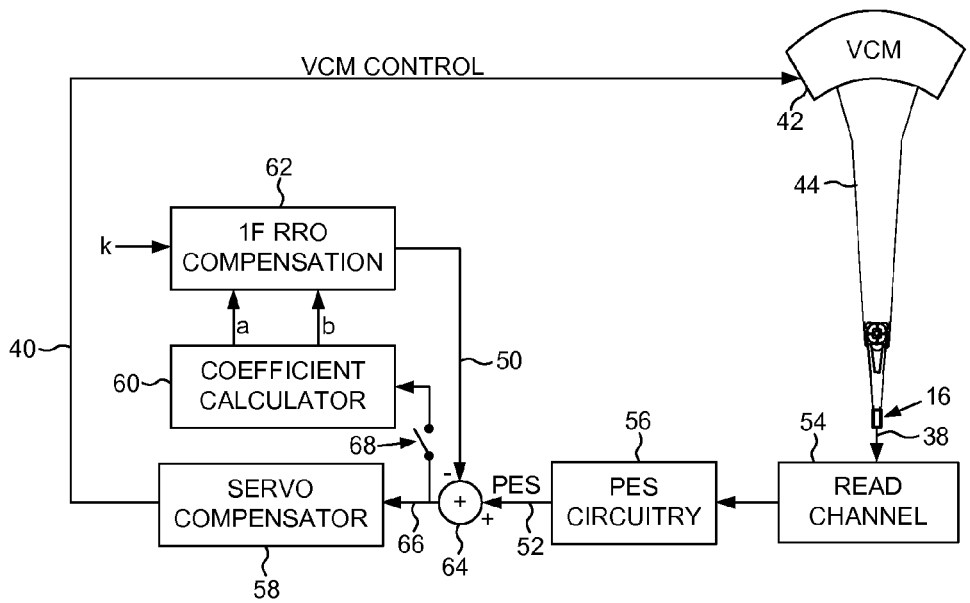
FIG. 5B shows control circuitry according to an embodiment of the present invention wherein the RRO compensation values are subtracted from the PES so that the head follows the substantially circular data track of FIG. 4A.

In one embodiment, the control circuitry generates repeatable runout (RRO) compensation values representing a repeatable runout of the servo tracks, and subtracts the RRO compensation values from the PES, thereby causing the head to follow the substantially circular path of the data track and causing a corresponding radial velocity of the head relative to a servo track during a tracking operation as illustrated in FIGS. 4A and 4B. This embodiment is understood with reference to FIGS. 5A and 5B, wherein FIG. 5A shows control circuitry while calibrating the RRO compensation values 50, and FIG. 5B shows control circuitry for subtracting the RRO compensation values 50 from the PES 52 during normal operation. Referring to FIG. 5A, the control circuitry comprises a read channel 54 for demodulating the servo bursts from the read signal 38, and PES circuitry 56 for generating the PES 52 (e.g., using the equations shown in FIG. 3C or 3D). The RRO compensation values 50 are subtracted 64 from the PES 52 to generate a compensated PES 66. A servo compensator 58 filters the compensated PES 66 to generate a VCM control signal 40. A coefficient calculator 60 calculates coefficients of a sinusoid representing the sinusoidal RRO of the servo track. The coefficients of the sinusoid are processed by a compensation circuit 62 to generate an RRO compensation value 50 for each servo sector (indexed by k). During calibration, the coefficient calculator 60 adjusts the coefficients of the sinusoid until the average of the compensated PES 66 falls below a threshold (i.e., until the coefficients converge to correct values). Further details of how the coefficients of the sinusoid may be adapted are disclosed in U.S. Pat. No. 7,265,933 entitled "DISK DRIVE COMPUTING REPEATABLE RUN OUT WHILE ACTUATOR ARM IS PRESSED AGAINST CRASH STOP", the disclosure of which is incorporated herein by reference. Other embodiments may generate the RRO compensation values 50 using different techniques to achieve the same result.

Once the RRO compensation values 50 have been calibrated as described above with reference to FIG. 5A, during normal operation the RRO compensation values 50 are subtracted 64 from the PES 52 as shown in FIG. 5B so that the head does not follow the eccentric path of the servo track (but instead follows a substantially circular path of the data track shown in FIG. 4A). However, as described above, the accuracy of the PES remains substantially insensitive to the radial velocity of the head as it crosses over the servo tracks when using the servo pattern of FIG. 2B together with a suitable equation for generating the PES (e.g., the equations of FIG. 3C or 3D). In the embodiment of FIG. 5B, a switch 68 disables the input of the coefficient calculator 60 so that the coefficients of the sinusoid are not adapted during normal operation of the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo sectors that define a plurality of servo tracks, wherein the servo sectors comprise a plurality of servo bursts including:
   a first servo burst;

a second servo burst following the first servo burst and offset radially in a first direction by approximately one half of a servo track from the first servo burst;

a third servo burst following the second servo burst and offset radially in the first direction by approximately one full servo track from the second servo burst; and a fourth servo burst following the third servo burst and offset radially in a second direction opposite the first direction by approximately one half of a servo track from the third servo burst;

a head actuated over the disk; and control circuitry operable to:

position the head over a servo track;

read at least two of the servo bursts;

generate a numerator in response to: (i) the first and fourth servo bursts, (ii) the second and third servo bursts, or (iii) the first, second, third, and fourth servo bursts;

generate a denominator in response to a difference between two of the servo bursts;

generate a position error signal (PES) in response to a ratio of the numerator and the denominator; and position the head over the disk in response to the PES.

2. The disk drive as recited in claim 1, wherein an accuracy of the PES is substantially insensitive to a radial velocity of the head.

3. The disk drive as recited in claim 1, wherein the control circuitry is operable to select the servo bursts for generating the numerator and the denominator based on a boundary condition for the head.

4. The disk drive as recited in claim 3, wherein the control circuitry is operable to generate the PES in response to at least one of:

$$\frac{D-C}{B-A}; \text{ and}$$

$$\frac{B-A}{D-C}$$

depending on the boundary condition for the head, where:

C is the first servo burst;
A is the second servo burst;
B is the third servo burst; and
D is the fourth servo burst.

5. The disk drive as recited in claim 3, wherein the control circuitry is operable to generate the PES in response to at least one of:

$$\frac{B+D-A-C}{D-C};$$

$$\frac{B+D-A-C}{A-B};$$

$$\frac{A+D-B-C}{A-B};$$

$$\frac{A+D-B-C}{C-D};$$

$$\frac{A+C-B-D}{C-D};$$

$$\frac{A+C-B-D}{B-A};$$

$$\frac{B+C-A-D}{B-A}; \text{ and}$$

$$\frac{B+C-A-D}{D-C}$$

depending on the boundary condition for the head, where:

C is the first servo burst;
A is the second servo burst;
B is the third servo burst; and
D is the fourth servo burst.

6. The disk drive as recited in claim 1, wherein the control circuitry is further operable to:

generate repeatable runout (RRO) compensation values representing a repeatable runout of the servo tracks; and subtract the RRO compensation values from the PES thereby causing a radial velocity of the head relative to a servo track during a tracking operation.

7. A method of operating a disk drive comprising:

a head actuated over a disk comprising a plurality of servo sectors that define a plurality of servo tracks, wherein the servo sectors comprise a plurality of servo bursts including:

a first servo burst;

a second servo burst following the first servo burst and offset radially in a first direction by approximately one half of a servo track from the first servo burst;

a third servo burst following the second servo burst and offset radially in the first direction by approximately one full servo track from the second servo burst; and a fourth servo burst following the third servo burst and offset radially in a second direction opposite the first direction by approximately one half of a servo track from the third servo burst;

the method comprising:

positioning the head over a servo track;

reading at least two of the servo bursts;

generating a numerator in response to: (i) the first and fourth servo bursts, (ii) the second and third servo bursts, or (iii) the first, second, third, and fourth servo bursts;

generating a denominator in response to a difference between two of the servo bursts;

generating a position error signal (PES) in response to a ratio of the numerator and the denominator; and positioning the head over the disk in response to the PES.

8. The method as recited in claim 7, wherein an accuracy of the PES is substantially insensitive to a radial velocity of the head.

9. The method as recited in claim 7, further comprising selecting the servo bursts for generating the numerator and the denominator based on a boundary condition for the head.

10. The method as recited in claim 9, further comprising generating the PES in response to at least one of:

$$\frac{D-C}{B-A}; \text{ and}$$

$$\frac{B-A}{D-C}$$

depending on the boundary condition for the head, where:

C is the first servo burst;
A is the second servo burst;
B is the third servo burst; and
D is the fourth servo burst.

11. The method as recited in claim 9, further comprising generating the PES in response to at least one of:

$$\frac{B+D-A-C}{D-C};$$

$$\frac{B+D-A-C}{A-B};$$

$$\frac{A+D-B-C}{A-B};$$

$$\frac{A+D-B-C}{C-D};$$

$$\frac{A+C-B-D}{C-D};$$

$$\frac{A+C-B-D}{B-A};$$

$$\frac{B+C-A-D}{B-A}; \text{ and}$$

$$\frac{B+C-A-D}{D-C}$$

depending on a boundary condition for the head, where:
C is the first servo burst;
A is the second servo burst;
B is the third servo burst; and
D is the fourth servo burst.

12. The method as recited in claim 7, further comprising:
generating repeatable runout (RRO) compensation values representing a repeatable runout of the servo tracks; and
subtracting the RRO compensation values from the PES thereby causing a radial velocity of the head relative to a servo track during a tracking operation.

13. A disk drive comprising:
a disk comprising a plurality of servo sectors that define a plurality of servo tracks, wherein the servo sectors comprise a plurality of servo bursts including:
a first servo burst;
a second servo burst following the first servo burst and offset radially in a first direction by approximately one half of a servo track from the first servo burst;
a third servo burst following the second servo burst and offset radially in the first direction by approximately one full servo track from the second servo burst; and
a fourth servo burst following the third servo burst and offset radially in a second direction opposite the first direction by approximately one half of a servo track from the third servo burst;
a head actuated over the disk; and
control circuitry operable to:
position the head over a servo track;
read at least two of the servo bursts;
generate a numerator in response to at least two of the servo bursts;
generate a denominator in response to the difference between the first and fourth servo bursts or the difference between the second and third servo bursts;
generate a position error signal (PES) in response to a ratio of the numerator and the denominator; and
position the head over the disk in response to the PES.

14. The disk drive as recited in claim 13, wherein an accuracy of the PES is substantially insensitive to a radial velocity of the head.

15. The disk drive as recited in claim 13, wherein the control circuitry is operable to select the servo bursts for generating the numerator and the denominator based on a boundary condition for the head.

16. The disk drive as recited in claim 13, wherein the control circuitry is further operable to:
generate repeatable runout (RRO) compensation values representing a repeatable runout of the servo tracks; and
subtract the RRO compensation values from the PES thereby causing a radial velocity of the head relative to a servo track during a tracking operation.

17. A method of operating a disk drive comprising:
a head actuated over a disk comprising a plurality of servo sectors that define a plurality of servo tracks, wherein the servo sectors comprise a plurality of servo bursts including:
a first servo burst;
a second servo burst following the first servo burst and offset radially in a first direction by approximately one half of a servo track from the first servo burst;
a third servo burst following the second servo burst and offset radially in the first direction by approximately one full servo track from the second servo burst; and
a fourth servo burst following the third servo burst and offset radially in a second direction opposite the first direction by approximately one half of a servo track from the third servo burst;
the method comprising:
positioning the head over a servo track;
reading at least two of the servo bursts;
generating a numerator in response to at least two of the servo bursts;
generating a denominator in response to the difference between the first and fourth servo bursts, or the difference between the second and third servo bursts;
generating a position error signal (PES) in response to a ratio of the numerator and the denominator; and
positioning the head over the disk in response to the PES.

18. The method as recited in claim 17, wherein an accuracy of the PES is substantially insensitive to a radial velocity of the head.

19. The method as recited in claim 17, further comprising selecting the servo bursts for generating the numerator and the denominator based on a boundary condition for the head.

20. The method as recited in claim 17, further comprising:
generating repeatable runout (RRO) compensation values representing a repeatable runout of the servo tracks; and
subtracting the RRO compensation values from the PES thereby causing a radial velocity of the head relative to a servo track during a tracking operation.

* * * * *